(12) United States Patent
Karale et al.

(10) Patent No.: US 11,168,542 B2
(45) Date of Patent: Nov. 9, 2021

(54) SCHEDULING TREATMENT FLUID PLACEMENT AND FLUID DIVERSION IN A SUBTERRANEAN FORMATION

(71) Applicant: Halliburton Energy Services, Inc., Houston, TX (US)

(72) Inventors: Chaitanya Mallikarjun Karale, Pune (IN); Rama Subba Reddy Thavva, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 579 days.

(21) Appl. No.: 15/768,632

(22) PCT Filed: Nov. 16, 2015

(86) PCT No.: PCT/US2015/060788
§ 371 (c)(1),
(2) Date: Apr. 16, 2018

(87) PCT Pub. No.: WO2017/086906
PCT Pub. Date: May 26, 2017

(65) Prior Publication Data
US 2018/0306013 A1 Oct. 25, 2018

(51) Int. Cl.
*E21B 41/00* (2006.01)
*E21B 43/00* (2006.01)
(Continued)

(52) U.S. Cl.
CPC ............ *E21B 41/00* (2013.01); *E21B 33/122* (2013.01); *E21B 33/146* (2013.01);
(Continued)

(58) Field of Classification Search
CPC ...... E21B 33/122; E21B 33/146; E21B 43/00; E21B 43/2406; E21B 43/261;
(Continued)

(56) References Cited

U.S. PATENT DOCUMENTS 5,161,613 A   11/1992 Jones
6,196,318 B1  3/2001 Gong et al.
(Continued)

FOREIGN PATENT DOCUMENTS

WO   WO-2012087864 A2   6/2012
WO   WO-2015013697 A1   1/2015

OTHER PUBLICATIONS

Jones, A.T., et al., "Quantifying Acid Placement: The Key to Understanding Damage Removal in Horizontal Wells," Society of Petroleum Engineers; pp. 163-169 (This paper [SPE 509751] was revised from paper SPE 31146, first presented at the 1996 SPE International Symposium on Formation Damage Control, held in Lafayette, Louisiana, U.S.A. Feb. 14-15. Original manuscript received for review Apr. 24, 1996. Revised manuscript. Paper peer approved Apr. 30, 1998) SPE Production & Facilities, Aug. 1998.
(Continued)

*Primary Examiner* — Christopher J Sebesta
(74) *Attorney, Agent, or Firm* — Locke Lord LLP

(57) ABSTRACT

Methods, systems, and computer program products for generating a schedule for fluid placement. A computer-implemented method may include determining, for each zone of a plurality of zones of a treatment interval to be treated by the fluids placement system, a criterion value based on a heterogeneity parameter of the zone, sorting the zones into an ordered sequence based on the criterion value associated with each zone, and generating a schedule that designates an order of treating the zones in accordance with the order of the sequence.

14 Claims, 6 Drawing Sheets

(51) Int. Cl.

| | | |
|---|---|---|
| E21B 33/122 | (2006.01) | |
| E21B 33/14 | (2006.01) | |
| E21B 43/26 | (2006.01) | |
| C09K 8/42 | (2006.01) | |
| C09K 8/74 | (2006.01) | |
| E21B 43/24 | (2006.01) | |

(52) U.S. Cl.
CPC .......... *E21B 41/0057* (2013.01); *E21B 43/00* (2013.01); *E21B 43/261* (2013.01); *C09K 8/426* (2013.01); *C09K 8/74* (2013.01); *E21B 43/2406* (2013.01)

(58) Field of Classification Search
CPC ...... E21B 41/00; E21B 41/0057; G06F 17/16; C09K 8/74; C09K 8/426
See application file for complete search history.

(56) References Cited

U.S. PATENT DOCUMENTS

| | | | |
|---|---|---|---|
| 6,668,922 | B2 | 12/2003 | Ziauddin et al. |
| 8,016,034 | B2 | 9/2011 | Glasbergen et al. |
| 2003/0225521 | A1* | 12/2003 | Panga .................... E21B 43/25 702/6 |
| 2006/0000609 | A1* | 1/2006 | Cavazzoli ............... E21B 43/14 166/280.1 |
| 2006/0157242 | A1* | 7/2006 | Graham ................ E21B 43/305 166/268 |
| 2008/0015832 | A1 | 1/2008 | Tardy |
| 2010/0161292 | A1* | 6/2010 | Shook .................... E21B 49/00 703/2 |
| 2011/0277996 | A1 | 11/2011 | Cullick et al. |
| 2014/0182841 | A1 | 7/2014 | Lecerf et al. |
| 2014/0212006 | A1* | 7/2014 | Zhao ..................... G06T 7/0004 382/109 |
| 2015/0041123 | A1* | 2/2015 | Troshko ................ E21B 43/121 166/254.1 |

OTHER PUBLICATIONS

Acid placement and coverage; http://petrowiki.org/Acidplacement_and_coverage#cite_note-r12-11, Web page last visited Jun. 4, 2018.

Glasbergen, G., et al., "Improved Acid Diversion Design Using a Placement Simulator," SPE 102412, pp. 1-11, Society of Petroleum Engineers (prepared for the 2006 SPE Russian Oil and Gas Technical Conference and Exhibition held in Moscow, Russia), Oct. 3-6, 2006.

Glasbergen, G., et al., "The Optimum Injection Rate for Wormhole Propagation: Myth or Reality?" SPE 121464, pp. 1-18, Society of Petroleum Engineers (prepared for presentation at the 2009 SPE European Formation Damage Conference held in Scheveningen, The Netherlands), May 27-29, 2009.

Ramondenc, Pierre, et al., "Achieving Optimum Placement of Stimulating Fluids in Multilayered Carbonate Reservoirs: A Novel Approach," SPE 166184, pp. 1-11, Society of Petroleum Engineers (prepared for presentation at the SPE Annual Technical Conference and Exhibition held in New Orleans, Louisiana, USA), Sep. 30-Oct. 2, 2013.

Ahmed, D., et al., "An Innovative Approach to Forecasting Matrix Stimulation Treatment Results: A Case Study," SPE 168157, pp. 1-11, Society of Petroleum Engineers (prepared for presentation at the SPE International Symposium and Exhibition on Formation Damage Control held in Lafayette, Louisiana, USA), Feb. 26-28, 2014.

International Search Report and Written Opinion for PCT Application No. PCT/2015/060788, dated Aug. 1, 2016.

* cited by examiner

SCHEDULING TREATMENT FLUID PLACEMENT AND FLUID DIVERSION IN A SUBTERRANEAN FORMATION

FIELD OF THE DISCLOSURE

The present disclosure generally relates to treatment fluid placement and diversion systems that may be useful in treating subterranean formations, and more particularly, to scheduling stages of treatment fluid placement and diversion for respective zones of a subterranean formation having different heterogeneity parameters, e.g., flow resistance parameters, such as permeability, viscosity, or skins, reservoir pressure, etc.

BACKGROUND

Treatment fluids may be used in a variety of subterranean treatments. As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof. Examples of common subterranean treatments include, but are not limited to, acidizing treatments (e.g., matrix acidizing or fracture acidizing), drilling operations, pre-pad treatments, fracturing operations, perforation operations, preflush treatments, afterflush treatments, sand control treatments (e.g., gravel packing, sand consolidation, etc.), "frac-pack" treatments, cementing treatments, water control treatments/conformance, fluid loss control treatments (e.g., gel pills), scale squeeze treatment, and well bore clean-out treatments.

In subterranean treatments, it is often desired to treat an interval of a subterranean formation having sections of respective varying heterogeneity parameters, such as permeability, porosity, skin (e.g., damage, mechanical, etc.), and/or reservoir pressures. Each of the sections, based on its respective heterogeneity parameter, may accept a different amount of treatment fluid. For example, a heterogeneity parameter, e.g., low reservoir pressure, in a certain zone of a subterranean formation or a rock matrix or proppant pack, may permit that zone to accept larger amounts of treatment fluid relative to a zone having high reservoir pressure. It may be difficult to obtain a uniform distribution of the treatment fluid throughout the entire interval. For instance, the treatment fluid may preferentially enter zones of the interval with low fluid flow resistance at the expense of zones of the interval with higher fluid flow resistance.

In conventional methods of treating such subterranean formations, to overcome heterogeneity and achieve a uniform treatment effect of the treatment interval, a first zone of a treatment interval that is initially treated with the main treatment fluid, may be sealed off from the treatment fluid, fully or partially, using variety of techniques to divert treatment fluids to a second zone of the treatment interval that has a different heterogeneity than the first zone. The use of the term "first" when referring to the first zone is in order to differentiate from the second zone, but is not intended to indicate a feature of the "first zone," such as a physical position in the treatment interval. Scheduling the sequence of introducing treatment fluid and using diversion methods to the various zones of the interval that have different f heterogeneity parameters can optimize the treatment to obtain a relatively uniform treatment effect over the different zones. Additionally, using an effective amount of treatment fluid for each zone avoids unwanted leakoff and waste of treatment fluid and assures sufficient availability of treatment fluid for each of the zones. However, designing a schedule for treatment fluid placement and diversion, as well as determining the amount of treatment fluid to place in each zone, is performed by highly experienced and skilled professionals using a time-consuming and costly simulation process using trial and error.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. The drawing in which an element first appears is generally indicated by the left-most digit in the corresponding reference number.

DESCRIPTION OF PREFERRED EMBODIMENTS

In accordance with the present disclosure, a computer-implemented method is provided to schedule placement and diversion of treatment fluid in different zones of a treatment interval in a subterranean formation. The zones can be layers, or other areas that are defined by one or more heterogeneity parameters, e.g., that affect flow-resistance (flow-resistance parameters). An order of the zones is determined using a criterion that is based on at least one heterogeneity parameter associated with each of the zones The schedule includes assigning each of the zones, in accordance with their order, at least one of a placement stage or a diversion stage, forming a schedule having a series of stages that can be used to treat the treatment interval. In addition, the method includes determining a volume of treatment fluid to be placed during respective stages. A pore volume, a number of pore volumes, and a pore volume multiplier are determined for each treatment stage. A diverter volume is decided for each diverter stage. A first (e.g., topmost) zone of the ordered zones is assigned a treatment stage, and a last (e.g., bottommost) zone of the ordered zones is assigned a displacement stage. For the intervening zones between the first and last zones, using the assigned order and the relative permeability of adjacent zones, a determination is made whether to assign each of the intervening zones a treatment stage or a diverter stage followed by a treatment stage. The volume to be used at each stage is determined using the pore volume of the zone to be treated, number of pore volumes, pore volume multiplier, and the remaining volume of treatment fluid available.

Figure 1:
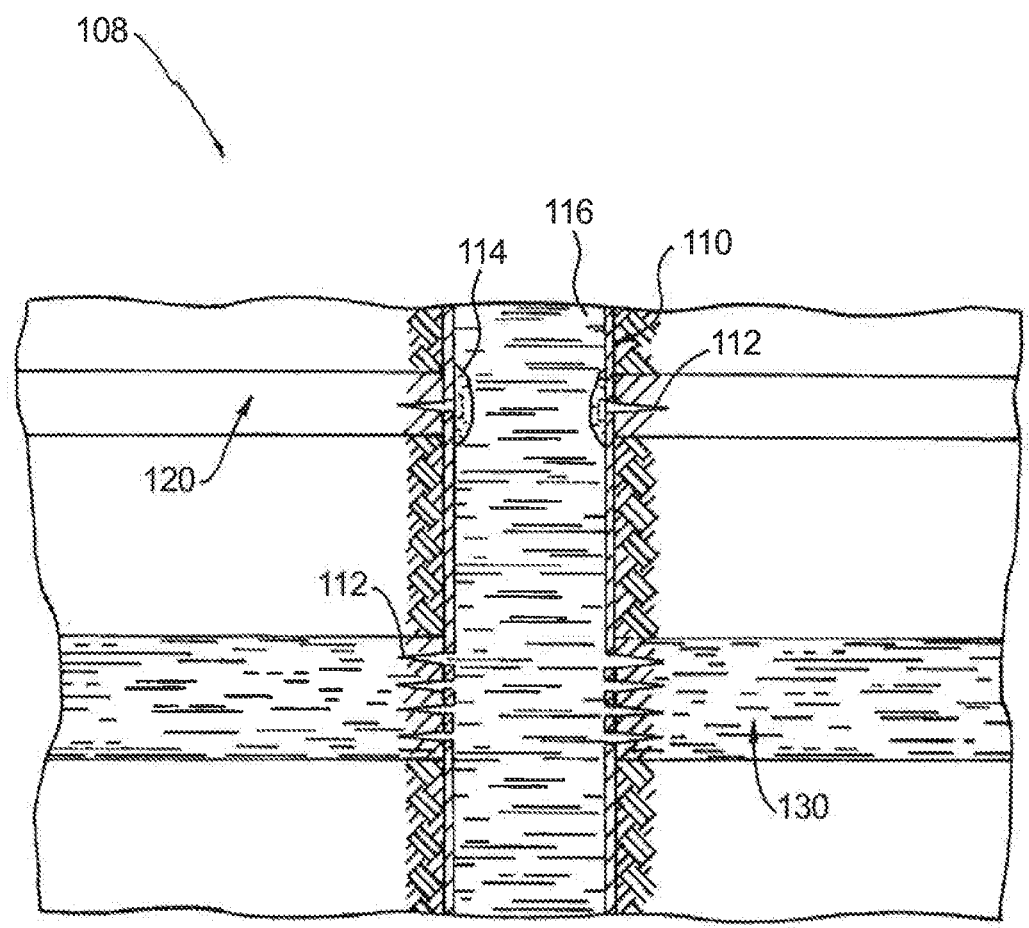
FIG. 1 illustrates a side view of a subterranean formation having zones with different heterogeneity parameters penetrated by a wellbore for placing and diverting treatment fluid in a treatment interval of the subterranean formation.

With reference to FIG. 1, a side view of an example treatment interval 108 of a subterranean formation penetrated by a wellbore is shown, with a casing string 110 placed in the wellbore. The well bore penetrates two zones 120 and 130 of the treatment interval 108, wherein the heterogeneity, e.g., fluid flow resistance, of zone 130 is different than the heterogeneity, e.g., fluid flow resistance, of zone 120, such as due to different flow-resistance parameters of zones 120 and 130. The treatment interval and its zones 120 and 130 are located in a reservoir of the subterranean formation. Perforations 112 are formed in the casing 110. Zone 120 may have a lower flow-resistance than zone 130. As shown, fewer perforations 112 are provided in the casing at zone 120 than at zone 130.

A diversion is applied to zone 120, shown in this example as placement of a diverting material 114, to obstruct zone 120 and divert a treatment fluid 116 flowing into the wellbore to other zones of the subterranean formation. The treatment fluid 116 is to introduced into zone 130 because the diverting material 114 diverts the treatment fluid 116 away from zone 120. Introduction of the treatment fluid 116 into the zone 120 of the reservoir causes relatively easy displacement of a retrievable fluid, such as petroleum or gas from the zone 120 of the reservoir after the treatment. The term "diverting material," as used herein, means and refers generally to a material that functions to reduce or prevent, either temporarily or permanently, the flow of treatment fluid into a particular location, usually located in a subterranean formation, wherein the diverting material serves to at least partially obstruct the location and thereby cause the fluid to "divert" to a different location.

The term "fluid flow resistance" as used herein, means and refers generally to the diminishment of the rate at which fluid will flow into and/or through a subterranean area when the fluid is introduced at a fixed rate of injection. Fluid flow resistance can be determined by one or more flow-resistance or heterogeneity parameters of the treatment interval 108. Such parameters include, for example, permeability, reservoir pressure, porosity, leakoff rate, skins e.g. damage, mechanical etc. The treatment interval 108 treated in the methods of the present disclosure may be, for example, any treatment interval of a subterranean formation having at least two zones of differing fluid flow resistances. At least a zone of the investigation interval 108 generally is penetrated by one or more well bores drilled in any direction through the formation. In certain embodiments, all or part of a well bore penetrating the investigation interval 108 may include casing pipes or strings placed in the well bore (a "cased hole" or a "partially cased hole" or "slotted liner completion"), among other purposes, to facilitate production of retrievable fluids out of the formation and through the well bore to the surface. In other embodiments, the well bore may be an "open hole" that has no casing.

The diverting material(s) used in the present disclosure may include any material or combination of materials that functions to reduce or prevent, either temporarily or permanently, the flow of a fluid into a particular zone in the investigation interval 108, wherein the diverting material serves to at least partially obstruct the zone and thereby cause the fluid to "divert" to a different zone. Examples of materials that may be suitable for use as a diverting material in the present disclosure include, but are not limited to, fluids (e.g., aqueous-based and/or non-aqueous-based fluids), emulsions, gels (including but not limited to viscoelastic surfactant gels or polymeric gels), surfactants (e.g., soaps or viscoelastic surfactants), foams, particulate materials (e.g., calcium carbonate, silica flour), certain polymers, relative permeability modifiers, degradable materials (e.g., polyesters, orthoesters, poly(orthoesters), polyanhydrides, polylactic acid, dehydrated organic or inorganic compounds, anhydrous borate, salts of organic acids, or any derivative thereof), resins (e.g., water soluble resins, oil soluble resins, etc.), balls, packers (e.g., pinpoint packers and selective injection packers), ball sealers, pack-off devices, sand plugs, bridge plugs, and the like.

As used herein, the term "treatment fluid" refers generally to any fluid that may be used in a subterranean treatment application in conjunction with a desired function and/or for a desired purpose. The term "treatment fluid" does not imply a particular action by the fluid or any component thereof. These fluids may be used to perform one or more subterranean treatments, which may include any subterranean treatments known in the art. Examples of common subterranean treatments include, but are not limited to, drilling operations, pre-pad treatments, fracturing operations, perforation operations, preflush it) treatments, afterflush treatments, sand control treatments (e.g., gravel packing, sand consolidation, etc.), acidizing treatments (e.g., matrix acidizing or fracture acidizing), "frac-pack" treatments, cementing treatments, water control treatments, scale squeeze treatment, and well bore clean-out treatments.

Depending on the type of treatment to be performed, the fluid may comprise any treatment fluid known in the art. Examples of treatment fluids that may be suitable include fracturing fluids, gravel packing fluids, pre-pad fluids, pad fluids, preflush fluids, afterflush fluids, acidic fluids, consolidation fluids, cementing fluids, well bore clean-out fluids, conformance fluids, aqueous fluids (e.g., fresh water, salt water, brines, etc.), non-aqueous fluids (e.g., mineral oils, synthetic oils, esters, etc.), hydrocarbon-based fluids (e.g., kerosene, xylene, toluene, diesel, oils, etc.), foamed fluids (e.g., a liquid that comprises a gas), gels, emulsions, gases, and the like. The treatment fluids used in the present disclosure optionally may comprise one or more of any additives known in the art, provided that such additives do not interfere with other components of the treatment fluid or other elements present during its use. Examples of such additional additives include, but are not limited to, gelling agents, salts, soaps, surfactants, co-surfactants, carboxylic acids, acids, fluid loss control additives, gas, foamers, corrosion inhibitors, scale inhibitors, crosslinking agents, catalysts, clay control agents, biocides, friction reducers, antifoam agents, bridging agents, dispersants, flocculants, H2S scavengers, oxygen scavengers, lubricants, viscosifiers, breakers, weighting agents, relative permeability modifiers, resins, particulate materials (e.g., proppant particulates), wetting agents, coating enhancement agents, and the like. A person skilled in the art, with the benefit of this disclosure, will recognize the types of additives that may be included in the treatment fluids for a particular application.

Figure 2:
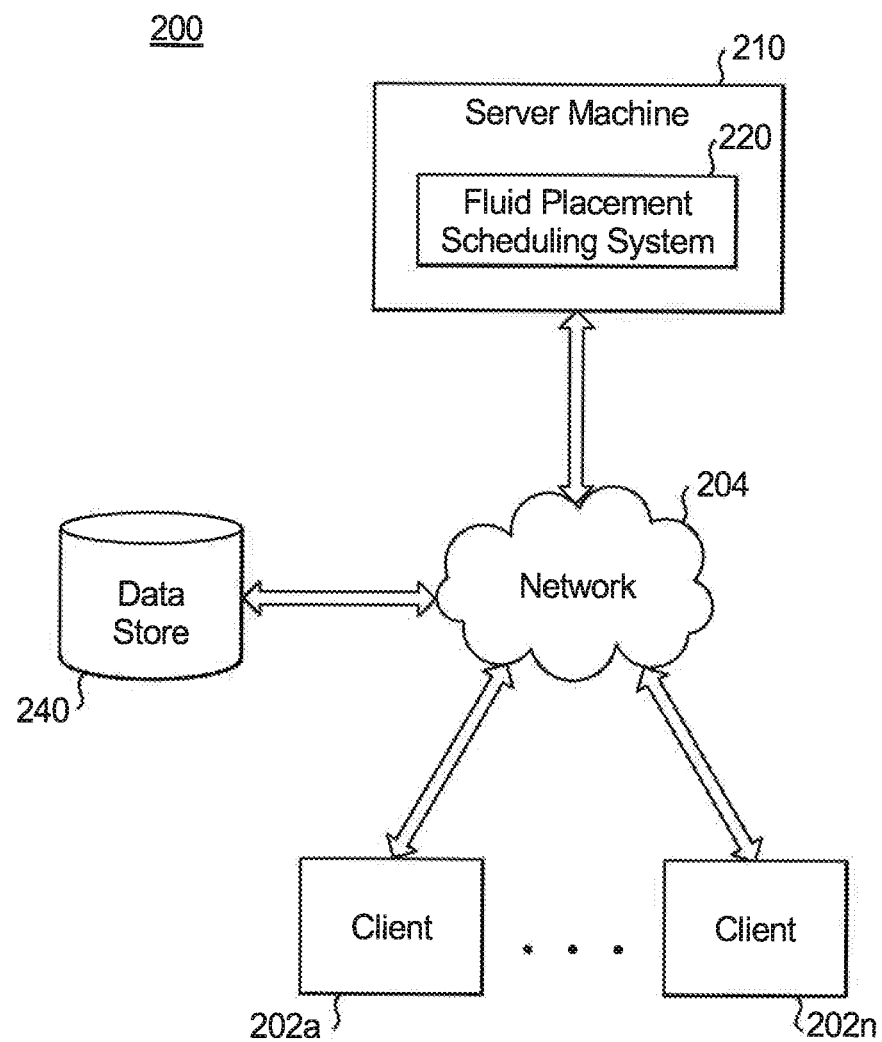
FIG. 2 illustrates a system architecture, in accordance with various embodiments of the present disclosure.

FIG. 2 illustrates system architecture 200 in which embodiments of the disclosure can be implemented. System architecture 200 includes server machine 210, data store 240 and client machines 202A-202N connected to a network 204. Network 204 may be a public network (e.g., the Internet), a private network (e.g., a local area network (LAN), a wide area network (WAN)), or a combination thereof. The server machine 210 and the client machines 202A-202N can communicate with the network or one another via wireless or wired links. The client machines 202A-202N can submit requests to and receive output from the server machine 210.

Client machines 202A-202N may be personal computers (PC), laptops, mobile phones, tablet computers, or any other computing device. Client machines 202A-202N may run an operating system (OS) that manages hardware and software of the client machines 202A-202N.

Server machine 210 may be a rackmount server, a router computer, a personal computer, a portable digital assistant, a mobile phone, a laptop computer, a tablet computer, a netbook, a desktop computer, a media center, or any combination thereof.

Server machine 210 includes a fluid placement scheduling system 220. In some embodiments, fluid placement scheduling system 220 may run on one or more different machines. In other embodiments, fluid placement scheduling system 220 may run on a single machine.

In general, functions described as being performed by server 210 also or alternatively may be performed on client machines 202A-202N. In addition, the it) functionality attributed to a particular component can be performed by different or multiple components operating together. Server 210 also can be accessed as a service provided to other systems or devices through appropriate application programming interfaces.

Data store 240 is persistent storage that is capable of storing various types of data (e.g., text, graphics, tables, audio, video, images, or maps). In some embodiments data store 240 might be a network-attached file server, while in other embodiments data store 240 might be some other type of persistent storage such as an object-oriented database, a relational database, and so forth.

In an example, data store 240 stores measurement data obtained from measuring devices that monitor\or properties associated with heterogeneity parameters and/or physical characteristics of zones of the subterranean formation. The measurement data can include actual or simulated data obtained, for example, via user entry, imported from log data (e.g., provided by an operator or owner of a well that is being processed by the wellbore), and/or from measurement equipment, e.g., that tests core samples. Examples of measurement data include, without limitation, measured depth, production logging tool (PLT) log data, initial total skins for respective layers, total skin for the entire well, total skin for the treatment interval, inflow for respective layers, porosity, permeability, young's modulus, poisson's ratio, mineralogy (sample vs depth), bottom hole static temperature (BHST), bottom hole pressure, (BHP), reference reservoir pressure and depth, fracture gradient, and reservoir fluid details, which can include reference values (e.g., for density, compressibility, viscosity at downhole conditions). Most of the information comes from measurement using logs and testing core samples etc. Additionally, the data store 240 can store values calculated based on the measurement data and variables that can be used by the fluid it) placement scheduling system 220.

One skilled in the art will readily understand that the data store 240 can be included in the server machine 210 and/or any of the client machines 202A-202N. One skilled in the art will also recognize that the server machine 220 can be a standalone system that includes a user interface that communicates with one or more user input devices (e.g. a keyboard, mouse, touchscreen) and a user output device (a display device, a printer, an audio speaker). Requests can be received via the user interface and results can be output to the user interface.

Fluid placement scheduling system 220 may perform a scheduling analysis using one or more input parameters having raw measurement data, processed measurement data, and variables associated with corresponding zones of a treatment interval or with the overall treatment interval.

For example, fluid placement scheduling system 220 may receive measurement data associated with a treatment interval and respective zones of the treatment interval and perform analysis to determine a schedule for placing and diverting a treatment fluid relative to the zones. The schedule can specify volumes of treatment fluid to use for each placement of treatment fluid.

Figure 3:
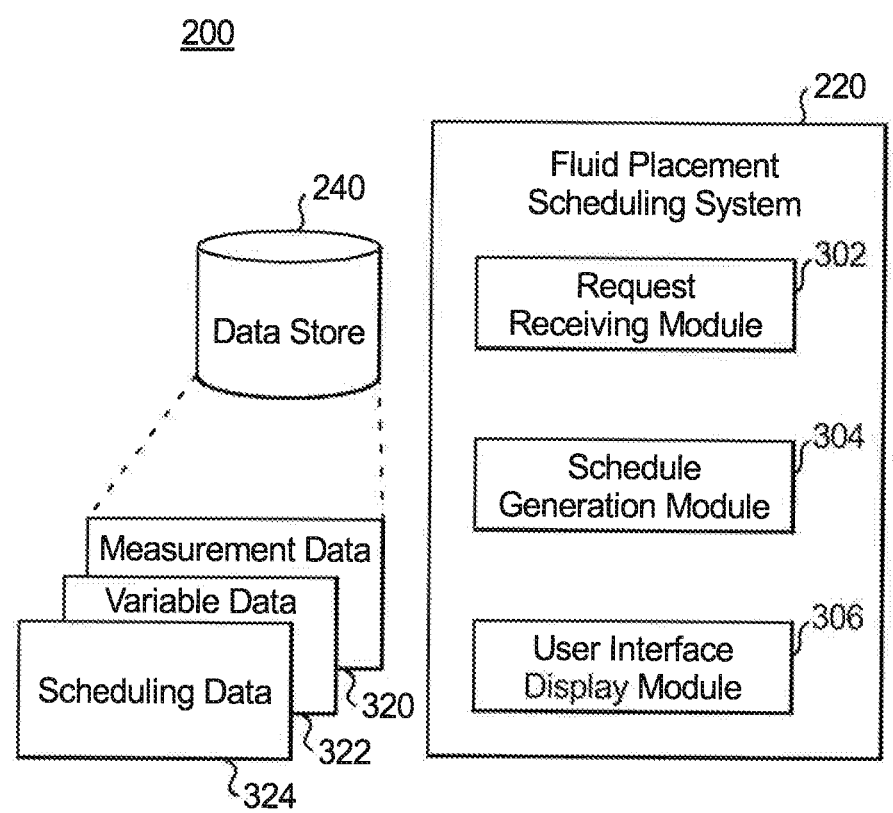
FIG. 3 is a block diagram illustrating an example fluid placement scheduling system, in accordance with the disclosure.

FIG. 3 is a block diagram illustrating a fluid placement scheduling system 220, in accordance with an embodiment. Fluid placement scheduling system 220 includes request receiving module 302, schedule generation module 304, and user interface display module 306. In other embodiments, functionality associated with one or more of request receiving module 302, schedule generation module 304 and user interface display module 306 may be combined, divided and organized in various arrangements. Fluid placement scheduling system 220 can be coupled to data store 240. Data store 240 can store measurement data 320, variable data 322, and/or scheduling data 324.

The measurement data 320 can include data associated with the interval and its environment, including, for example, wellbore pressure, reservoir pressure (e.g., zone pressure), drainage radius, $r_e$; wellbore radius, $r_w$; and total height of the treatment interval. The measurement data 320 can further include data associated with respective zones i of the treatment interval, including, for example:

permeability, $k_{0i}$;
total height of zone(i) $h_{tot,i}$;
total skin of zone(i), $S_{tot,i}$;
top measured depth (MD) indicating a physical location of the top of the zone in the treatment interval;
bottom MD indicating a physical location of the bottom of the zone in the treatment interval;
$h_{tot,i}$, indicating (bottom MD-top MD);

The variable data 322 can include, for example:
selectable constants, such as reservoir fluid viscosity, μ; formation volume factor, B; multiplier, b, wherein multiplier b is determined depending on a relationship between main treatment volume and a preferred condition, such as but not limited to diverter volume>wellbore volume associated with the treatment interval; and
weighting factor exponent a (e.g., $-5 \leq a \leq 5$, or in embodiments, $1 \leq a \leq 2$).

The reservoir fluid viscosity, μ can be user defined well parameters, that can be user-defined well parameters, e.g., from the customer, or can be related to downhole conditions that may be obtained from measurements performed at the surface. The formation volume factor, B can be a reservoir fluid property that can be user-defined well parameters, e.g., from the customer.

Measurement data 320 that is processed (processed measurement data 320) can include, for example and without limitation:
calculated parameter P1; wherein P1 is calculated for each zone(i) to determine the stage volume to be pumped for respective stages and to distribute the stage volume across the different stages.

The scheduling data 324 can include a sorting criterion for sorting zones of the identified treatment interval.

In this regard, the measurement data, or a portion thereof, may include data acquired from sensors or other equipment and uniquely associated with a particular reservoir or drilling system. Additionally, the measurement data 320, the variable data 322, and the scheduling data 324, or a portion thereof, may be generally representative of the treatment interval, the treatment interval's environment, a drilling system being used, and/or a scheduling analysis being used.

Request receiving module 302 receives input parameters to the fluid placement scheduling system 320. The input parameters may be received as part of a user generated or automated request to perform schedule generation. In one example, the input parameters can include or identify measurement data 320, variable data 322, and/or scheduling data 324. The input parameters or data identified by the input parameters can be retrieved from the data store 240 or received from external measuring devices, processing devices, and/or user input, and then stored in data store 240.

Schedule generation module 304 generates a fluid placement schedule for fluid placement and fluid diversion associated with zones of the identified treatment interval. User interface display module 306 then displays the generated schedule results to a user, which can be presented, for example, textually, graphically, as an image, e.g., via a graphical user interface (GUI).

Figure 4:
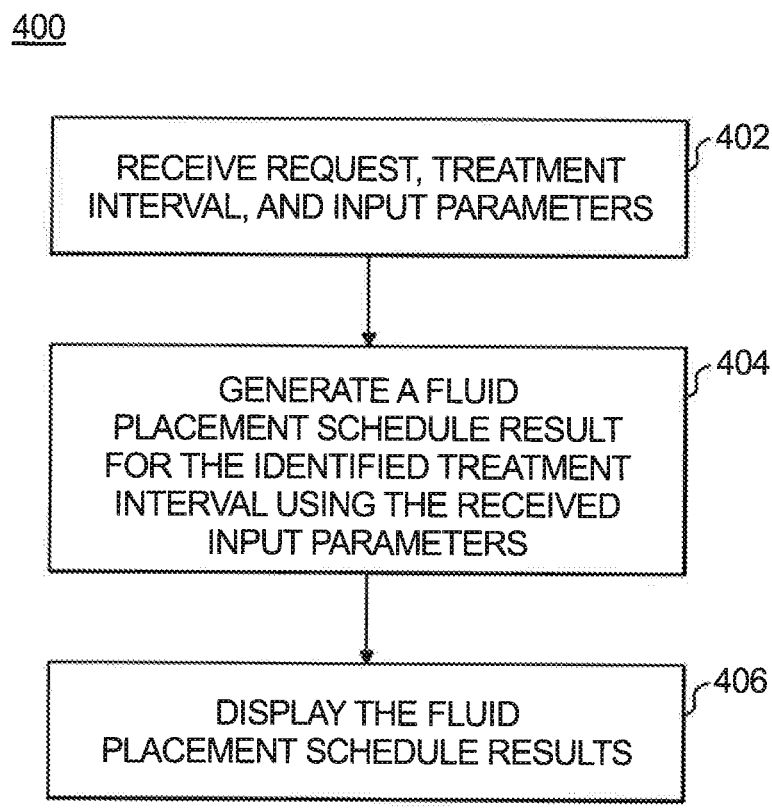
FIG. 4 is a flowchart illustrating an example method performed by the fluid placement scheduling system in accordance with the disclosure.

FIG. 4 is a flowchart illustrating a method 400 of fluid placement scheduling, according to an embodiment. Method 400 is performed by processing logic that may comprise hardware (circuitry, dedicated logic, etc.), software (such as is run on a general purpose computer system or a dedicated machine), or a combination of both. In embodiments, method 400 can be performed by server machine 210 of FIG. 1. Method 400 may be performed by schedule generating fluid placement scheduling system 220 running on server machine 210 or one or more other computing devices.

Method 400 begins at operation 402, when a request is received with input parameters and an identified treatment interval. The request is to generate a schedule for fluid placement in the identified treatment interval. The input parameters can include user-entered, measured, and calculated data, for example, pressure drop (e.g., wellbore pressure-reservoir pressure), permeability, total height, total skin, top MD, bottom MD, weight, P1, and a weighting factor for respective zones of the treatment interval; criteria to be used for sorting zones of the treatment interval, drainage radius, wellbore radius, formation volume factor, and fluid viscosity of the treatment interval. The input parameters can be user entered, retrieved from data store 240, received from a device, such as a measurement device or a processing device, or a combination thereof. Operation 402 may be performed by, for example, request receiving module 402.

At operation 404, a fluid placement schedule result is generated using the received input parameters in response to the request. At operation 406, the fluid placement schedule results are displayed or otherwise output to the user, for example, user interface display module 306. The fluid placement schedule results may also or alternatively be stored in data store 240 for subsequent access.

Figure 5:
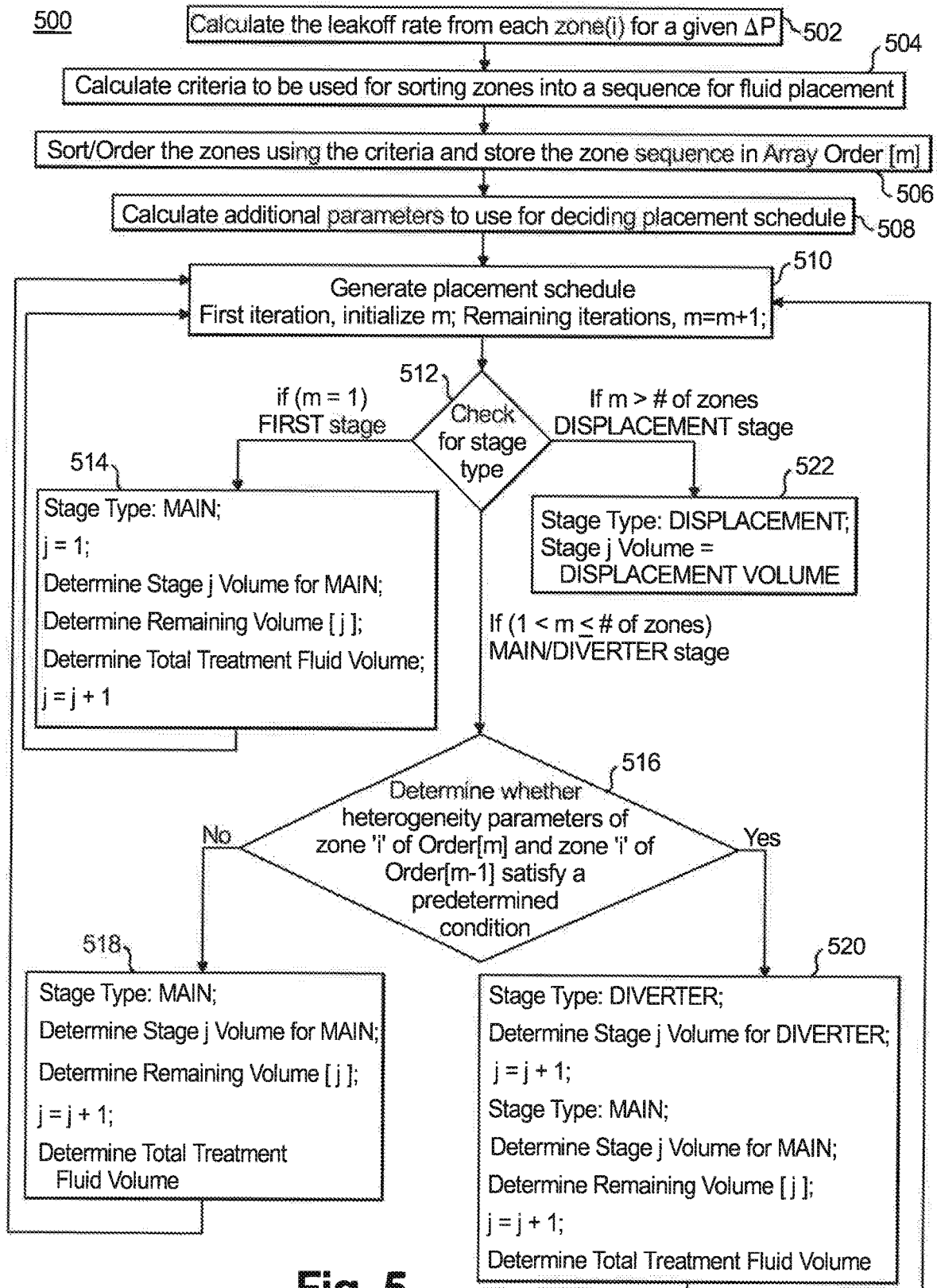
FIG. 5 is a flow chart illustrating an example method of schedule generation in accordance with the disclosure.

FIG. 5 is a flow diagram illustrating an example method 500 of generating a fluid placement schedule. Method 500 is performed by processing logic that may comprise hardware (circuitry, dedicated logic, etc.), software (such as is run on a general purpose computer system or a dedicated machine), or a combination of both. Method 500 can be performed by server machine 210 of FIG. 2. The operations of method 500 may be performed by the schedule generation module 304 of fluid placement scheduling system 220 running on server machine 210 or one or more other computing devices.

At operation 502, the leak off rate $Q_i$ is determined for each zone(i) of a treatment interval that has been identified for analysis in accordance with example Equation 1:

$$Q_i = \Delta P \cdot \frac{2\pi \cdot k_{0,i} \cdot h_{tot,i}}{\mu \cdot B \cdot \left(\ln\frac{r_e}{r_w} - \frac{3}{4} + S_{tot,i}\right)} \quad \text{Equation (1)}$$

where, as provided by the received input parameters,
$\Delta P$: Pressure difference between the wellbore and the reservoir pressure;
$k_{0,i}$: Permeability;
$r_e$: Drainage radius;
$r_w$: Wellbore radius;
$h_{tot,i}$: Total height of zone(i); and
$S_{tot,i}$: Total skin of zone(i).

At operation 504, one or more criteria identified to be used for ordering and sorting the zones (as provided by the received input parameters) is calculated. An example criterion can be a weighted leakoff rate that weights the leakoff rate based on a physical location of the zone in the treatment interval. For example, the criterion for zone(i) can be $Q_i * \text{Weight}^a_i$, wherein 'a' is a weighting factor exponent that is equal to a constant value. In an example, $\text{Weight}^a_i = (\text{Total treatment interval height} - \text{TopMD})^a$ and a=2.

Other examples of criteria for sorting the zones, are based on, without limitation, one or more parameters, such as $k_{0,i}$, $Q_i$ for a given $\Delta P$, total skin,$_i$, weight,$_i$, $h_{tot,i}$, and Total treatment interval height, or a combination thereof. Additional examples include, without limitation, a combination of criteria based on $k_{0,i}$ or $Q_i$ combined with one or more of $h_{tot,i}$, and Total treatment interval height. Additional examples of criteria include, without limitation:
$k_0/h_{tot,i}$
$Q_i/h_{tot,i}$
$k_0/h_{tot,i} * (\text{Total treatment interval height} - \text{TOP MD}_{,i})$
$Q_i/h_{tot,i} * (\text{Total treatment interval height} - \text{TOP MD}_{,i})$
$k_0/h_{tot,i} * (\text{Total treatment interval height} - \text{TOP MD}_{,i})^a$; and
$Q_i/h_{tot,i} * (\text{Total treatment interval height} - \text{TOP MD}_{,i})^a$.

At operation 506, the zones of the identified treatment interval are sorted (e.g., from lowest to highest or highest to lowest) based on criteria values calculated for the criteria. The sequence of sorted zones is stored in an array Order[m].

At operation 508, parameters used for generating the fluid placement schedule are calculated. The parameters can include, for example PV and P1. For example:

PV=Pore volume of each zone up to radial distance to be treated (e.g., 2 ft., but not limited thereto), for example:

$$PV, i = \frac{\pi}{4}(d^2_{wellbore} - d^2_{rt}) \times h_{tot,i} \times \emptyset, i$$

where $\emptyset,_i$=porosity of zone i, $d_{wellbore}$=diameter of the wellbore,
$d_{rt}$=2*radial distance to be treated; and $$P1_i = 100 \times \frac{Q_i \times \text{Weight}^a_i}{\sum_{i=1}^{n} Q_i \times \text{Weight}^a_i}$$

At operation 510, m is determined for selecting a zone [m], which is a zone of the sequence of zones Order[m]. At the first iteration of operation 510, m=1 and the first zone of Order[m] is selected. Also at the first iteration, Stage(j) volume, Remaining Volume[j], and Total treatment fluid volume are initialized to 0. For each subsequent iteration, m is incremented by 1 until all of the zones of Order[m] have been analyzed, e.g., until m> the total number of zones.

At operation 512, a determination is made whether m=1, 1<m≤total number of zones, or m>total number of zones. If m=1, the method continues at operation 514. If 1<m≤total number of zones, the method continues at operation 516. If m total number of zones, the method continues at operation 522.

At operation 514, a main treatment stage is added as a first stage of a sequence of stages(j) for treating the treatment interval. The first stage, stage(j), wherein j=1, is associated with zone 'i' of Order[m]. In addition, a stage type of main treatment is assigned to stage(j). A main treatment stage type can refer to a non-diverted treatment that is intended to cause a particular affect. In an example, the main treatment is an acid treatment in which a determined volume of acid fluid is placed in zone T of Order[m]. The volume placed at zone i during stage(j) is referred to as a stage volume. The stage volume is determined using at least one of #PV, PV(Order[m]), $PV_{multiplier}$. The Remaining Volume[j] is determined using at least one of #PV, PV(Order[m]), $PV_{multiplier}$, the total number of zones, and m. The total treatment fluid volume is determined using at least one of a previous value for total treatment fluid volume and SV[j]. In embodiments, the stage volume of stage(j), SV[j], Remaining Volume[j], and Total treatment fluid volume can be calculated in accordance with example Equations 2, 3, and 4 as follows:

Stage(j) Volume = Equation 2
$$SV[j] = \#PV \times PV(\text{Order}[m]) \times PV_{multiplier}, [j]$$

Remaining Volume[j] = Equation 3
$$\left( \frac{\#PV \times PV(\text{Order}[m]) \times (1 - PV_{multiplier},[j])}{\# \text{ of Zones} - m} \right)$$

Total treatment fluid volume = Equation 4
Total treatment fluid volume + SV[j]

where, $PV_{multiplier}$, [j] is selected so that 0< $PV_{multiplier}$[j]≤1. In an example and without limitation, $PV_{multiplier}$, [j], is determined based on $P1_{,i}$, for example, as follows:
 if 40<$P1_{,i}$<60 then $PV_{multiplier}$, [j]=0.5,
 if 60<$P1_{,i}$<80 then $PV_{multiplier}$, [j]=0.3, and
 if 80<$P1_{,i}$<100 then $PV_{multiplier}$, [j]=0.1,
 else $PV_{multiplier}$, [j]=1, wherein $P1_{,i}$ is calculated using the received input parameters.

PV describes an amount of pore volumes to be pumped for a zone 'i' of Order[m]. #PV can be determined for a corresponding main treatment fluid iteration based on formation under downhole conditions, known as Pore Volume to BreakThrough ($PV_{BT}$). Typical values for $PV_{BT}$ can range from 0<$PV_{BT}$≤100. In the example used, without limiting the value of $PV_{BT}$, $PV_{BT}$=1.

Remaining volume[j] is a volume emitted (spitted) from the stage(j) and distributed to other stages equally, with the amount distributed to the respective stages determined based on the magnitude of $PV_{multiplier}$, [j].

Total treatment fluid volume is a combined volume of all main treatment stages. Total treatment fluid volume is used as a reference volume.

After operation 514, j is incremented by 1, and the method continues at operation 510 to advance to the next zone.

At operation 516, a determination is made whether a heterogeneity parameter of the zone 'i' of Order[m] and of the previous zone 'i' of Order[m−1], satisfy a predetermined condition. In other words, a determination is made whether a diverter stage is needed to divert the treatment fluid from the previous zone 'i' of Order[m−1]. In the example shown, and without limitation, the heterogeneity parameter is permeability. Other examples of heterogeneity parameters include, for example, $k_i/h_{tot,i}$, and $Q_i$. In an example, and without limitation, the determination at operation 516 can include comparing a ratio of the respective permeabilities of zone 'i' of Order[m] and zone 'i' of Order[m−1] to one or more threshold values. In an example, and without limitation, the determination at operation 516 can include determining whether the following condition is satisfied in accordance with either of example Equations 5A or 5B:

Equation 5A
$$\left( \frac{(\text{Permeability}[\text{Order}[m-1]])}{(\text{Permeability}[\text{Order}[m]])} \right) \geq d \text{ or}$$
$$\left( \frac{(\text{Permeability}[\text{Order}[m-1]])}{(\text{Permeability}[\text{Order}[m]])} \right) \leq \frac{1}{d}$$

Equation 5B
$$\left( \frac{\text{Max}[\text{Permeability}[\text{Order}[m-1]]: \text{Permeability}[\text{Order}[m]]]}{\text{Min}[\text{Permeability}[\text{Order}[i-1]]: \text{Permeability}[\text{Order}[i]]]} \geq d \right),$$

wherein d is user selectable, for example 1≤d≤500. In an example, d=2.

If the condition is not satisfied, the method continues at operation 518, in which a next stage, stage(j), is added to the sequence of stages for treating the treatment interval at zone 'i' of Order[m−1]. A stage type of main treatment is assigned to stage(j). Additionally, a stage volume of stage(j), SV[j], and Total treatment fluid volume are calculated for stage(j). SV[j] is calculated using Remaining Volume[j] as calculated for previous stage(j−1), and at least one of #PV, PV(Order[m]), and $PV_{multiplier}$. The Remaining Volume[j] and the total treatment fluid volume can be determined similarly as in operation 514.

Accordingly, in embodiments, SV[j], Remaining Volume[j], and Total treatment fluid volume can be calculated for stage(j), e.g., in accordance with Equations 6, 7, and 8 as follows, after which the method continues at operation 510 to advance to the next zone:

Stage j Volume = Equation 6
$$SV[j] = (\#PV \times PV[\text{Order}[m]] \times PV_{multiplier}, [j]) + \sum_{j=1}^{j-1} \text{Remaining Volume}[j]$$

Remaining Volume[j] = Equation 7
$$\left( \frac{\#PV \times PV[\text{Order}[m]] \times (1 - PV_{multiplier}, [j])}{\# \text{ of Zones} - m} \right)$$

Total treatment fluid volume = Equation 8
Total treatment fluid volume + SV[j]

If the condition is satisfied, the method continues at operation 520, in which a next stage, stage(j) is added to the sequence of stages for treating the treatment interval at zone 'i' of Order[m−1]. A diverter stage type is assigned to stage(j). A diverter stage type can refer to a diverted treatment that is intended to prevent at least a portion of a next subsequent treatment fluid from entering zone T of Order [m−1], i.e., a previously treated zone. Additionally, a stage volume of stage(j), SV[j], can be calculated based on the stage volume from the previous stage, such as by multiplying the stage volume of the previous stage by a reduction constant that is less than or equal to one. In an embodiment, SV[j] can be determined in accordance with example Equations 9, and as follows, $$\text{Stage}(j) \text{ Volume} = SV[j] = b \times SV[j-1] \quad \text{Equation 9}$$

where b<1. In an example embodiment, b=0.15. Next, an additional stage, stage(j) is added to the fluid placement schedule for treating zone T of Order[m] of the treatment interval. Stage(j) is assigned a stage type of main treatment. Additionally, a stage volume of stage(j), SV[j], and Total volume are calculated for stage(j) in accordance with Equations 6, 7, and 8, after which the method continues at operation 510 to advance to the next zone 'i' of Order[m] or next m.

The Stage(j) Volume applied during the diverter stage(j) at operation 520 is a volume of diverter that is less than the volume associated with a previous treatment stage. Since operation 520 assigns both a diverter stage and a main stage to zone 'i' of Order[m], the diverter stage diverts from the previous zone 'i' of Order[ m−1], after which a main treatment stage is applied to zone 'i' of Order[m].

At operation 522, stage(j) is assigned a stage type of displacement. Additionally, a stage volume of stage(j), SV[j] is determined to equal a displacement volume. The displaced volume is a wellbore volume with/without pore volume up to a radial distance selected to be displaced. For example, a displacement volume can be determined in order to displace the treatment fluids into a 5 ft. radius in the formation.

When the schedule includes two or more consecutive stages of the same stage type, the stages can be merged into a single combined stage. The stage volume for the combined stage is the sum of the stages that were combined to form the combined stage.

The fluid placement schedule generated using the disclosed method can be used to improve distribution of fluid penetration amongst various zones of a treatment interval having various heterogeneity parameters, such as pressure drop, permeability, skins, etc. Experimentation performed using a fluid placement schedule generated using the disclosed method indicates improved distribution of treatment fluid penetration among different zones included in a treatment interval and increased total treatment fluid penetration relative to diversion or aqueous-based fluid treatment techniques that do not use a schedule generated in accordance with the disclosed method. Efficient diversion and improved treatment fluid penetration improve stimulation of the formation.

The foregoing embodiments presented herein are particularly useful when stimulating a subterraneous formation having oil and gas reservoirs, such as using wellbores drilled in the formations.

Embodiments of the present disclosure may be described statically by using a schedule generated in accordance with the disclosed methods, systems and computer program products as part of implementing an actual or simulated stimulation of a drilling plan. In addition, those of ordinary skill in the art will appreciate that such embodiments may also be implemented dynamically using actual or simulated feedback data to adjust the schedule. In another example, the methods, systems and computer program products described herein may be utilized during the actual or simulated drilling and stimulation process, on the fly, or iteratively, to calculate and re-calculate characteristics of the reservoir over a period of time as parameters change, are clarified, or are adjusted. Thus, in an example, results of dynamic calculations may be utilized to alter a previously implemented fluid placement schedule for a drilling plan. For example, such dynamic calculations may result in the adjustment of the order of zones in the sequence, adjustment of stages assigned to the zones, and/or adjustment of stage volumes.

Figure 6:
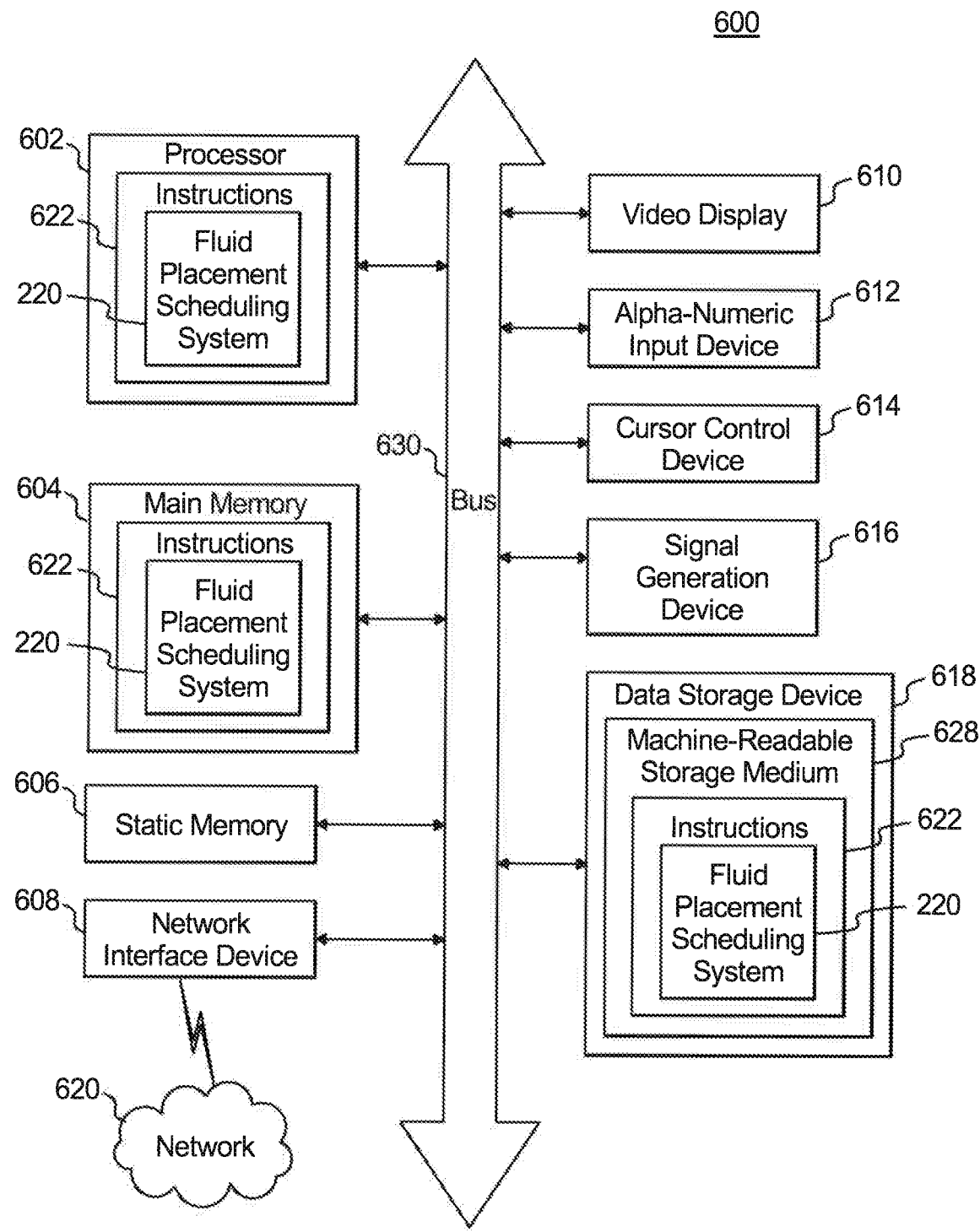
FIG. 6 is a block diagram of an exemplary computer system that may perform one or more of the operations described herein.

FIG. 6 illustrates a diagram of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or on the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602, also constituting computer-readable storage media. The instructions 622 may further be transmitted or received over a network 620 via network interface device 608.

In one embodiment, the instructions 622 include instructions for fluid placement scheduling system (e.g., fluid placement scheduling system 220 of FIG. 2) and/or a software library containing methods that call a fluid placement scheduling system. While the computer-readable storage medium 628 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

While a fluid placement scheduling system has been described primarily in the context of hydrocarbon reservoir modeling, it will be appreciated by persons of ordinary skill in the art that the sensitivity analysis system may be used for other applications where sensitivity analysis may be desirable or useful.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, term's, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "computing", "comparing", "displaying", "adjusting," "applying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present disclosure also relate to an apparatus for performing the operations described herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although various embodiments and methodologies have been shown and described, the present disclosure is not limited to such embodiments and methodologies and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A computer system to generate a fluids placement schedule of a fluids placement system, the computer system comprising:
   at least one processor; and
   at least one memory coupled to the at least one processor and storing instructions that when executed by the at least one processor performs operations comprising:
   determining, for each zone of a plurality of zones of a treatment interval to be treated by the fluids placement system, a criterion value based on a heterogeneity parameter of the zone;
   sorting the zones into an ordered sequence based on the criterion value associated with each zone, wherein the sequence is based on a preselected criteria, the preselected criteria $Q_i$ is determined for each zone(i) of a treatment interval that has been identified for analysis in accordance with:

$$Q_1 = \Delta P \cdot \frac{2\pi \cdot k_{0,i} \cdot h_{tot,i}}{\mu \cdot B \cdot \left(\ln\frac{r_e}{r_w} - \frac{3}{4} + s_{tot,i}\right)}$$

where,
ΔP: Pressure difference between the wellbore and the reservoir pressure;
k0,i: Permeability;
re: Drainage radius;
rw: Wellbore radius;
htot,i: Total height of zone(i); and
Stot,i: Total skin of zone(i);
generating a schedule that designates an order of treating the zones in accordance with the order of the sequence;
wherein the at least one processor further performs operations comprising:
determining whether a heterogeneity parameter of one of the zones and an adjacent zone satisfy a predetermined condition;
selecting at least one stage type for the zone based on whether the predetermined condition stage was satisfied, the at least one stage type being selected from at least one a main treatment stage and a diverter stage, wherein the predetermined condition includes comparing a ratio between permeability associated with the zone and permeability associated with the adjacent zone to at least one threshold value; and
updating the schedule to designate a stage associated with each stage type selected for the zone, and storing a sequence of sorted zones is stored in an array [m] and wherein a determination is made whether a diverter stage is needed to divert the treatment fluid from the previous zone 'i' of Order[m−1].

2. The computer system of claim 1, wherein the criterion value associated with one of the zones is related to at least one of the zone's skin, reservoir pressure, permeability, and location relative to the interval.

3. The computer system of claim 1, wherein the one zone and the adjacent zone are adjacent based on the ordered sequence.

4. The computer system of claim 1, wherein the at least one processor further performs operations comprising:
determining a volume of treatment fluid to be placed at each stage associated with the zone; and updating the schedule to designate the volumes determined for each stage.

5. The computer system of claim 4, wherein the volume to be placed at one of the stages is determined based on at least one of a relative position of the associated zone in the treatment interval and pore volume of the associated zone.

6. The computer system of claim 4, wherein the at least one processor further performs operations comprising:
combining consecutive stages of the schedule into one stage when the two or more consecutive stages have same stage type; and
assigning the volume for the combined stage to be a sum of the two or more consecutive stages that were combined to form the combined stage.

7. A method of treating a treatment interval with a treatment fluid, the method comprising treating a plurality of zones of a treatment interval using treatment fluids in an ordered sequence, wherein the sequence is based on a preselected criteria, the preselected criteria Qi is determined for each zone(i) of a treatment interval that has been identified for analysis in accordance with:

$$Q_1 = \Delta P \cdot \frac{2\pi \cdot k_{0,i} \cdot h_{tot,i}}{\mu \cdot B \cdot \left(\ln\frac{r_e}{r_w} - \frac{3}{4} + s_{tot,i}\right)}$$

where,
ΔP: Pressure difference between the wellbore and the reservoir pressure;
k0,i: Permeability;
re: Drainage radius;
rw: Wellbore radius;
htot,i: Total height of zone(i); and
Stot,i: Total skin of zone(i), wherein the zones are sorted in the ordered sequence based on a criterion value determined for the respective zones, the criterion value being based on a heterogeneity parameter of the respective zones, wherein the one zone and the adjacent zone are adjacent based on the ordered sequence, and wherein the predetermined condition is determined by comparing a ratio between permeability associated with the zone and permeability associated with the adjacent zone to at least one threshold value, further comprising storing a sequence of sorted zones is stored in an array [m] and wherein a determination is made whether a diverter stage is needed to divert the treatment fluid from the previous zone 'i' of Order[m−1].

8. The method of claim 7, wherein the criterion value associated with one of the zones is related to at least one of the zone's skin, reservoir pressure, permeability, and location relative to the interval.

9. The method of claim 7, further comprising treating respective zones in accordance with at least one stage type determined for that zone, wherein the stage type is determined for each of the respective zones based on whether a heterogeneity parameter of the zone and an adjacent zone satisfy a predetermined condition, the at least one stage type being selected from at least one of a main treatment stage and a diverter stage.

10. The method of claim 9, wherein the one zone and the adjacent zone are adjacent based on the ordered sequence.

11. The method of claim 10, further comprising using for each stage a volume of treatment fluid that is determined for the stage.

12. The method of claim 11, wherein the volume to be placed at one of the stages is determined based on at least one of a relative position of the associated zone in the treatment interval and pore volume of the associated zone.

13. A non-transitory computer readable medium comprising computer executable instructions for generating a fluids placement schedule of a fluids placement system the computer executable instructions when executed causes one or more machines to perform operations comprising:
determining, for each zone of a plurality of zones of a treatment interval to be treated by the fluids placement system, a criterion value based on a heterogeneity parameter of the zone;
sorting the zones into an ordered sequence based on the criterion value associated with each zone;
generating a schedule that designates an order of treating the zones in accordance with the order of the sequence, wherein the sequence is based on a preselected criteria, the preselected criteria Qi is determined for each zone (i) of a treatment interval that has been identified for analysis in accordance with:

where, $$Q_1 = \Delta P \cdot \frac{2\pi \cdot k_{0,i} \cdot h_{tot,i}}{\mu \cdot B \cdot \left(\ln\frac{r_e}{r_w} - \frac{3}{4} + s_{tot,i}\right)}$$

ΔP: Pressure difference between the wellbore and the reservoir pressure;
k0,i: Permeability;
re: Drainage radius;
rw: Wellbore radius;
htot,i: Total height of zone(i); and
Stot,i: Total skin of zone(i);
determining whether a heterogeneity parameter of one of the zones and an adjacent zone satisfy a predetermined condition;
selecting at least one stage type for the zone based on whether the predetermined condition stage was satisfied, the at least one stage type being selected from at least one a main treatment stage and a diverter stage, storing a sequence of sorted zones is stored in an array [m]; and
updating the schedule to designate a stage associated with each stage type selected for the zone, wherein a determination is made whether a diverter stage is needed to divert the treatment fluid from the previous zone 'i' of Order[m−1], wherein the adjacency of the zones is in accordance with the ordered sequence, and wherein the predetermined condition includes comparing a ratio between permeability associated with the zone and permeability associated with the adjacent zone to at least one threshold value.

14. The computer readable medium of claim 13, wherein the operations further comprise:
determining a volume of treatment fluid to be placed at each stage associated with the zone; and updating the schedule to designate the volumes determined for each stage.

* * * * *